US011247506B2

(12) United States Patent
Kumar et al.

(10) Patent No.: US 11,247,506 B2
(45) Date of Patent: Feb. 15, 2022

(54) PRINTABLE BI-LUMINESCENT PIGMENT FOR SECURITY INK FORMULATION AND PROCESS FOR THE PREPARATION THEREOF

(71) Applicant: Council of Scientific and Industrial Research, New Delhi (IN)

(72) Inventors: Gupta Bipin Kumar, New Delhi (IN); Kumar Pawan, New Delhi (IN); Dhar Ajay, New Delhi (IN); Aswal Dinesh Kumar, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 310 days.

(21) Appl. No.: 16/163,982

(22) Filed: Oct. 18, 2018

(65) Prior Publication Data

US 2019/0111724 A1 Apr. 18, 2019

(30) Foreign Application Priority Data

Oct. 18, 2017 (IN) .............................. 201711037004

(51) Int. Cl.
*C09K 11/56* (2006.01)
*C09K 11/77* (2006.01)
*B42D 25/387* (2014.01)

(52) U.S. Cl.
CPC .......... *B42D 25/387* (2014.10); *C09K 11/565* (2013.01); *C09K 11/7794* (2013.01)

(58) Field of Classification Search
CPC .. C09K 11/584; C09K 11/565; C09K 11/7794
See application file for complete search history.

(56) References Cited

U.S. PATENT DOCUMENTS

| 4,835,396 A * | 5/1989 | Kitada | ..................... G03C 5/17 |
| | | | 250/483.1 |
| 2005/0068395 A1 * | 3/2005 | Haubold | ................ B41M 3/144 |
| | | | 347/100 |

(Continued)

FOREIGN PATENT DOCUMENTS

WO   WO2017055531   * 9/2017

OTHER PUBLICATIONS

Peng. Synthesis and photoluminescence of ZnS:Cu nanoparticles. Optical Materials 29 (2006) 313-317.*

(Continued)

*Primary Examiner* — Matthew E. Hoban
(74) *Attorney, Agent, or Firm* — Renner Kenner Greive Bobak Taylor & Weber

(57) ABSTRACT

A new concept of bi-luminescent security pigments includes lanthanide doped rare-earth compound with rare-earth free compound and its ink formulation. The unique features of this bi-luminescent security ink is that it emits two different colors when it is illuminated by using two different excitation wavelengths. This important feature makes it most suitable for printing of security codes or QR codes/security images on currency, important official documents, food and medicinal packaging etc. The prospective use of this bi-luminescent security ink provides a ground-breaking opening for easily printable, highly stable and unclonable bi-luminescent security codes for anti-counterfeiting applications.

3 Claims, 10 Drawing Sheets
(2 of 10 Drawing Sheet(s) Filed in Color)

(56) References Cited

U.S. PATENT DOCUMENTS

2016/0149061 A1* 5/2016 Yoon ................... H01L 31/0326
　　　　　　　　　　　　　　　　　　　　　136/265
2018/0346806 A1* 12/2018 Hivert ..................... C09D 5/22

OTHER PUBLICATIONS

Singh. Luminescence study of Eu3+ doped GdVO4 nanoparticles: Concentration, particle size, and core/shell effects. J. Appl. Phys. 104, 104307 (2008).*

* cited by examiner

PRINTABLE BI-LUMINESCENT PIGMENT FOR SECURITY INK FORMULATION AND PROCESS FOR THE PREPARATION THEREOF

FIELD OF THE INVENTION

The present invention relates to printable bi-luminescent pigment which emits dual colour (red and green) upon different excitation wavelengths of UV. Particularly, present invention relates to a process for the preparation of the pigment by using lanthanide doped rare-earth compound with rare-earth free compound. More particularly, present invention relates to bi-luminescent pigment useful for security ink formulation at low cost with dual mode emission feature at different excitation wavelengths which provides high-end security features to avoid counterfeiting of important data, currency and documents.

BACKGROUND OF THE INVENTION

The counterfeiting of important documents, data and currency has emerged as a serious threat for global economy and created a serious problem for everyone including companies, government bodies, etc. Consequently, numerous efforts are devoted worldwide to develop materials for anti-counterfeiting techniques to overcoming this serious problem. Many anti-counterfeiting technologies such as simple markers, plasmonic security labels, holograms, security inks and so on, were developed to combat counterfeiting. The luminescent materials such as conventional organic dyes, lanthanide based luminescent nanomaterials, semiconductor quantum dots, carbon based quantum dots, plasmonic nanomaterials, and metal-organic-frameworks (MOFs) etc. have been explored for the formulation of luminescent security ink to combat counterfeiting.

References may be made to Journal "Multifunctional rare-earth vanadate nanoparticles: luminescent labels, oxidant sensors, and MRI contrast agents, ACS Nano, 2014, 8, 11126-37, wherein the single excitation and emission of nanophosphors with different chemical formula have been discussed. However, present invention discloses the dual excitation and emissions with new empirical formula based on combinatory chemistry.

References may be made to Patent application US 2005/0064604 A1, relates to an assay which is based on resonance energy transfer (RET) or on fluorescence resonance energy transfer (FRET) and which contains a first molecule group A, which is labeled with at least one energy donor according to the invention, and at least one Second molecule group B, which is in each case labeled with at least one energy acceptor.

Recently, developed and initiated the use of bi-luminescent materials having high quantum yield for security ink. To accomplish this, several strategies were tried like admixing of two different downshift materials together or augmented activator in a single host lattice but each suffered either from the luminescence quenching or low quantum yield because of the conversion of radiative transitions to non-radiative transitions due to coupling of multiple rare-earth activator ions. These drawbacks were overcome by the introduction of a totally new and innovative concept of using highly bi-luminescent material by adopting the strategy of using lanthanide doped rare-earth compounds with rare-earth free compounds easily available at low cost for ink formulation which has capability of dual mode excitations in UV wavelengths and emits red and green colours. The admixing of lanthanide doped rare-earth compound with rare-earth free compound leads to the formation of pigment that prevents the loss of radiative transitions into non-radiative part.

In present invention, we have developed the method for synthesis of dual mode bi-luminescent pigment that emits red and green colour emission upon two different excitations wavelengths in UV region which is not explored till date. The process of synthesis is facile, economical and highly reproducible.

SUMMARY OF THE INVENTION

Main objective of the present invention is to provide bi-luminescent pigment which emits dual colour (red and green) upon different excitation wavelengths of UV. Another object of the present invention is to provide a facile method to produce large scale synthesis of highly bi-luminescent pigment by adopting the strategy of combinatory using lanthanide doped rare-earth compound with rare-earth free compound which are easily available at low cost.

Yet another object of the present invention is to provide an Ink formulation which has capability to emit dual red and green colour under UV wavelengths.

Accordingly, present invention provides a bi-luminescent security pigment comprising lanthanide doped rare-earth compound with rare-earth free compound in the ratio ranging between 1:3 to 1:5.

In an embodiment of the present invention, lanthanide doped rare-earth compound used is $Gd_{1-y}VO_4:EU_y^{3+}$ wherein y is 0.29-0.39.

In another embodiment of the present invention, rare-earth free compound used is $Zn_{1-x}S:Cu_x^{2+}$ wherein x is 0.01-0.03.

In yet another embodiment of the present invention, said pigment exhibit the green emission in the range of 500-580 nm centered at 526 nm at excitation in the range of 265-428 nm, centered at 338 nm.

In yet another embodiment of the present invention, said pigment exhibit the red emission peaks at 592 nm, 607 nm, 613 nm, 617 nm and 696 nm at excitation in the range of 234-350 nm, centered at 316 nm.

In yet another embodiment of the present invention, said pigment exhibit quantum efficiencies for green and red emissions are 68%, and 85%, respectively.

In yet another embodiment of the present invention, the lifetimes of bi-luminescent pigment for green and red emissions are 395.77 µs and 345.79 µs, respectively.

In yet another embodiment of the present invention, printed pattern prepared from the ink formulation exhibit prominent red and green colour emission under UV lamp of 254 nm and 365 nm, respectively.

In yet another embodiment, present invention provides a process for the preparation of bi-luminescent security pigment comprising the steps of:

i. preparing the solution of $ZnCl_2$ and $Na_2S$ separately in water;

ii. adding 1-3% by weight N-cetyl-N,N,N trimethylammonium bromide (CTAB) in the $ZnCl_2$ solution as prepared in step (i) with continuous stirring at the rate of 400 to 500 rpm for period in the range of 50 to 70 minute at temperature in the range of 25 to 35° C. to obtain a solution;

iii. dropwise adding $Na_2S$ solution as prepared in step (i) in the solution as obtained in step (ii) with constant stirring at the rate of 400 to 500 rpm followed by centrifuging at the rate in the range of 5000 to 6000 rpm to obtain milky white precipitate;

iv. washing and drying the precipitate as obtained in step (iii) at temperature in the range of 70 to 80° C. to obtain ZnS powder;

v. mixing the ZnS powder as obtained in step (iv) with $CuCl_2$ followed by heating at a temperature in the range of 700 to 750° C. for period in the range of 50 to 70 minute to obtain $Zn_{1-x}S:Cu_x$ wherein x is 0.01-0.03;

vi. mixing $Gd_2O_3$, $V_2O_5$ and $Eu_2O_3$ with $HNO_3$ to form homogeneous mixture;

vii. heating the mixture as obtained in step (vi) at temperature in the range of 800 to 900° C. for period in the range of 6 to 7 hours followed by cooling at temperature in the range of 25 to 35° C. to obtain $Gd_{1-y}VO_4$:$Eu_y$ wherein y is 0.29-0.39;

viii. mixing $Zn_{1-x}S:Cu_x$ as obtained in step (v) and $Gd_{1-y}VO_4$:$Eu_y$ as obtained in step (vii) separately in a solvent to form $Zn_{1-x}S:Cu_x$ and $Gd_{1-y}VO_4$:$Eu_y$ slurries;

ix. mixing the slurries as obtained in step (viii) in a ratio ranging between 1.5:1 to 2:1 by volume followed by drying at temperature in the range of 50 to 60° C. for period in the range of 22 to 24 hours to obtain the bi-luminescent pigment.

In yet another embodiment of the present invention, solvent used in step (viii) is ethanol. Another embodiment of the invention provides Ink formulation comprising Bi-luminescent security pigment for anti-counterfeiting application.

In yet another embodiment, present invention provides a process for the preparation of ink formulation, wherein said process comprising the steps of:

i. dispersing the bi-luminescent pigment in polyvinyl chloride with stirring followed by ultra-sonication for period in the range of 30 to 45 minutes to obtain the Ink formulation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Present invention provides a printable bi-luminescent pigment having high quantum yield for security ink formulation. However, several strategies like admixing of two different downshift materials together or augmented activator in a single host lattice were tried for the development of bi-luminescent ink but each suffered either from the luminescence quenching or low quantum yield because of the conversion of radiative transitions to non-radiative transitions due to coupling of multiple rare-earth activator ions. These drawbacks were overcome by the introduction of a totally new and innovative concept of using highly bi-luminescent materials by adopting the strategy of combinatory admixing of lanthanide doped rare-earth compounds with rare-earth free compounds easily available at low cost for ink formulation which has capability of dual mode excitations in UV wavelengths and emits red and green colours.

EXAMPLES

Following examples are given by way of illustration and therefore should not be construed to limit the scope of the invention.

Example 1

Synthesis of $Zn_{0.97}S:Cu_{0.03}^{2+}$ phosphor

Figure 1:
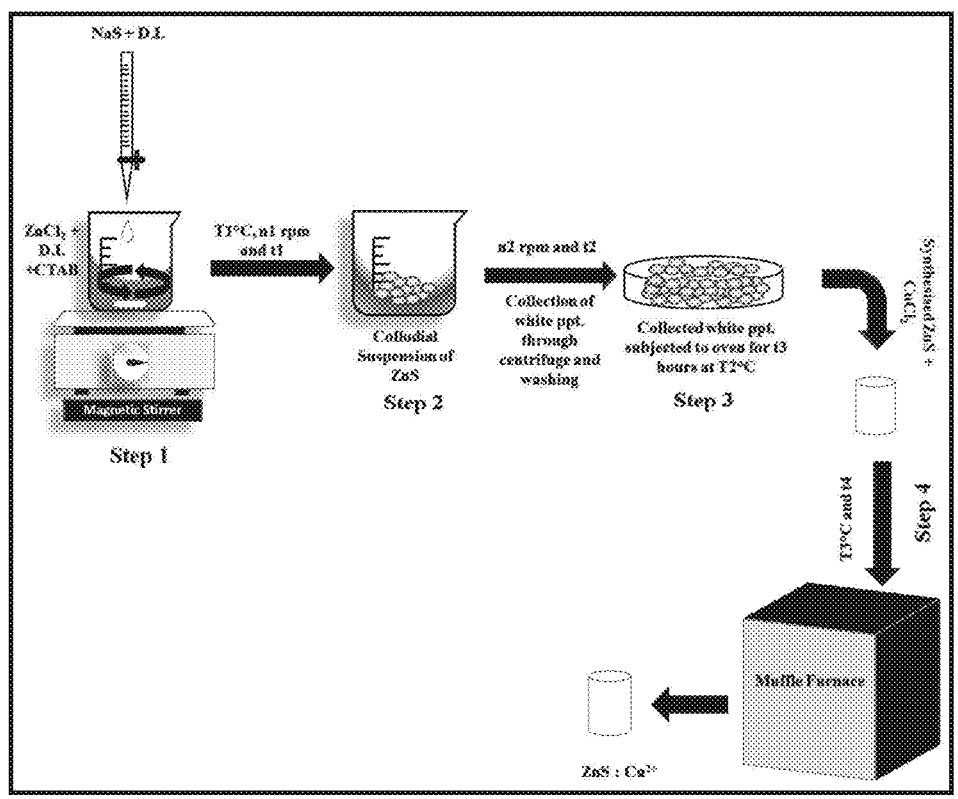
FIG. 1 represents schematic diagram showing steps for the preparation of ZnS:$Cu^{2+}$ phosphor.

The synthesis of $Zn_{0.97}S:Cu_{0.03}^{2+}$ phosphor is shown in schematic given in FIG. 1. Solutions of 1.36 gm $ZnCl_2$ and 0.78 gm $Na_2S$ were prepared separately in water in a beaker. Further the capping agent CTAB (1% by weight) added to $ZnCl_2$ solution with continuous stirring rate of 400 rpm for 1 hr at 30° C. $Na_2S$ was added drop wise in the solution. The solution was vigorously stirred under room temperature (27° C.) with constant stirring rate of 400 rpm for 1 hour for proper formation of milky white precipitates which were then collected by centrifugation at 5000 rpm. The former collected white precipitate were washed 2-3 times with water and was further transferred to an electrical oven to heat for 24 hour at 80° C. and the white powder of ZnS was formed.

Further, the white powder of 0.940 gm ZnS was mixed with 0.051 gm $CuCl_2$ in agate mortar by taking their stoichiometric amount according to empirical formula shown above which is further heated at a temperature 700° C. for 1 hour in box furnace to obtain $Zn_{0.97}S:Cu_{0.03}^{2+}$ phosphor.

Example 2

Synthesis of $Zn_{0.98}S:Cu_{0.02}^{2+}$ phosphor

The synthesis of $Zn_{0.98}S:Cu_{0.02}^{2+}$ phosphor is shown in schematic given in FIG. 1. Solutions of 6.81 gm $ZnCl_2$ and 3.90 gm $Na_2S$ were prepared separately in water in a beaker. Further the capping agent CTAB (1% by weight) added to $ZnCl_2$ solution with continuous stirring rate of 400 rpm for 1 hr at 30° C. Na$_2$S was added drop wise the solution. The solution was vigorously stirred under room temperature (27° C.) with constant stirring rate of 400 rpm for 1 hour for proper formation of milky white precipitates which were then collected by centrifugation at 5000 rpm. The former collected white precipitate were washed 2-3 times with water and was further transferred to an electrical oven to heat for 24 hour at 80° C. and the white powder of ZnS was formed.

Further, the white powder of 0.95 gm ZnS was mixed with 0.03 gm CuCl$_2$ in agate mortar by taking their stoichiometric amount which is further heated at a temperature 700° C. for 1 hour in box furnace to obtain ZnS:Cu$^{2+}$ phosphor.

Example 3

Synthesis of $Zn_{0.99}S:Cu_{0.01}^{2+}$ phosphor

The synthesis of $Zn_{0.99}S:Cu_{0.01}^{2+}$ phosphor is shown in schematic given in FIG. 1. Solutions of 1.36 gm ZnCl$_2$ and 0.78 gm Na$_2$S were prepared separately in water in a beaker. Further the capping agent CTAB (1% by weight) added to ZnCl$_2$ solution with continuous stirring rate of 400 rpm for 1 hr at 30° C. Na$_2$S was added drop wise in the solution. The solution was vigorously stirred under room temperature (27° C.) with constant stirring rate of 400 rpm for 1 hour for proper formation of milky white precipitates which were then collected by centrifugation at 5000 rpm. The former collected white precipitate were washed 2-3 times with water and was further transferred to an electrical oven to heat for 24 hour at 80° C. and the white powder of ZnS was formed.

Further, the white powder of 0.965 gm ZnS was mixed with 0.017 gm CuCl$_2$ in agate mortar by taking their stoichiometric amount according to empirical formula shown above which is further heated at a temperature 700° C. for 1 hour in box furnace to obtain $Zn_{0.99}S:Cu_{0.01}^{2+}$ phosphor.

Example 4

Synthesis of $Gd_{0.63}VO_4:Eu_{0.37}^{3+}$ phosphor

Figure 2:
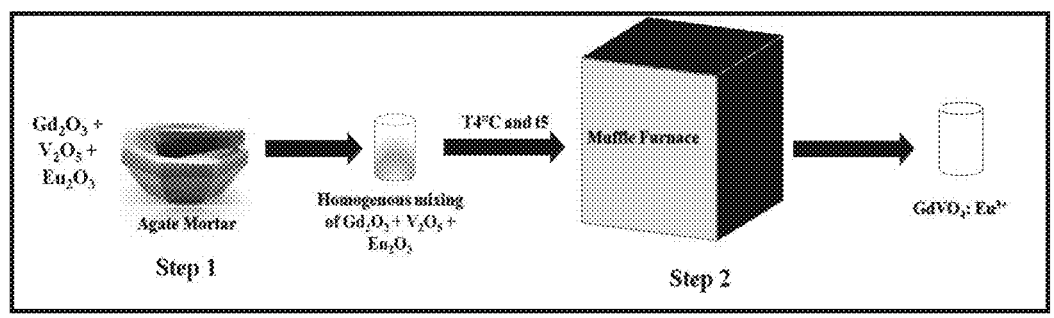
FIG. 2 represents schematic diagram showing steps for the preparation of $GdVO_4$:$Eu^{3+}$ phosphor.

The synthesis of GdVO$_4$:Eu$^{3-}$ phosphor is show in FIG. 2. 1.17 gm Gd$_2$O$_3$, 0.91 gm V$_2$O$_5$ and 0.62 gm Eu$_2$O$_3$ were mixed thoroughly in agate mortar to form a homogeneous mixture, while mixing 0.5 ml of HNO$_3$ was added. After proper mixing material was heated in a box furnace for 7 hour at 900° C. followed by natural cooling to obtain $Gd_{0.63}VO_4:Eu_{0.37}^{3+}$ phosphor.

Example 5

Synthesis of $Gd_{0.71}VO_4:Eu_{0.29}^{3+}$ phosphor

The synthesis of GdVO$_4$:Eu$^{3-}$ phosphor is show in FIG. 2. 1.28 gm Gd$_2$O$_3$, 0.91 gm V$_2$O$_5$ and 0.51 gm Eu$_2$O$_3$ were mixed thoroughly in agate mortar to form a homogeneous mixture, while mixing 0.5 ml of HNO$_3$ was added. After proper mixing material was heated in a box furnace for 7 hour at 900° C. followed by natural cooling to obtain $Gd_{0.71}VO_4:Eu_{0.29}^{3+}$ phosphor.

Example 6

Synthesis of $Gd_{0.66}VO_4:Eu_{0.34}^{3+}$ phosphor

The synthesis of GdVO$_4$:Eu$^{3-}$ phosphor is show in FIG. 2. 1.19 gm Gd$_2$O$_3$, 0.91 gm V$_2$O$_5$ and 0.59 gm Eu$_2$O$_3$ were mixed thoroughly in agate mortar to form a homogeneous mixture, while mixing 0.5 ml of HNO$_3$ was added. After proper mixing material was heated in a box furnace for 7 hour at 900° C. followed by natural cooling to obtain $Gd_{0.66}VO_4:Eu_{0.34}^{3+}$ phosphor.

Example 7

Synthesis of $Gd_{0.61}VO_4:Eu_{0.39}^{3+}$ phosphor

The synthesis of GdVO$_4$:Eu$^{3-}$ phosphor is show in FIG. 2. 1.10 gm Gd$_2$O$_3$, 0.91 gm V$_2$O$_5$ and 0.68 gm Eu$_2$O$_3$ were mixed thoroughly in agate mortar to form a homogeneous mixture, while mixing 0.5 ml of HNO$_3$ was added. After proper mixing material was heated in a box furnace for 7 hour at 900° C. followed by natural cooling to obtain $Gd_{0.61}VO_4:Eu_{0.39}^{3+}$ phosphor.

Example 8

Synthesis of Bi-Luminescent Pigment

Figure 3:
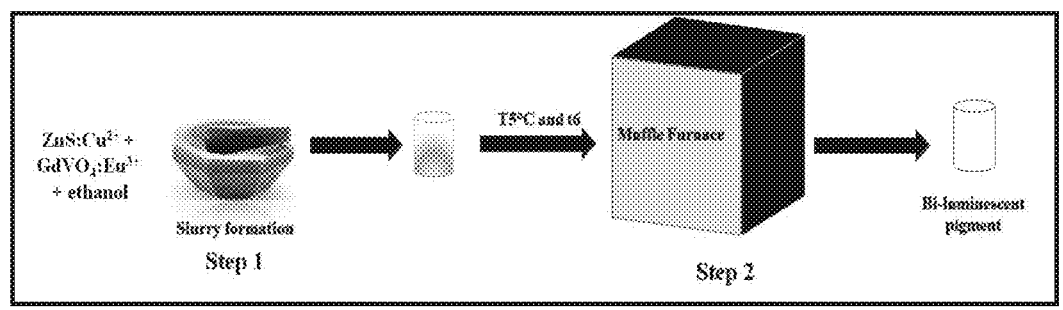
FIG. 3 represents schematic diagram showing steps for the preparation of bi-luminescent pigment.

The synthesis of bi-luminescent pigments is show in FIG. 3. Making slurry of pre-synthesized 10 mg $Zn_{0.98}S:Cu_{0.02}^{2+}$ and 40 mg $Gd_{0.63}VO_4:Eu_{0.37}^{3+}$ (ratio of 1:4 by weight) in 10 ml ethanol. Dry for 24 hours at 60° C. and bi-luminescent pigment of $Gd_{0.63}VO_4:EU_{0.37}^{3+}$ @$Zn_{0.98}S:CU_{0.02}^{2+}$ was formed.

Example 9

Synthesis of Bi-Luminescent Pigment

The synthesis of bi-luminescent pigments is show in FIG. 3. Making slurry of pre-synthesized 15 gm $Zn_{0.98}S:Cu_{0.02}^{2+}$ and 52.5 gm $Gd_{0.63}VO_4:Eu_{0.37}^{3+}$ (ratio of 1:3.5 by weight) in 25 ml ethanol. Dry for 24 hours at 55° C. and bi-luminescent pigment of $Gd_{0.63}VO_4:Eu_{0.37}^{3+}$ @$Zn_{0.98}S:Cu_{0.02}^{2+}$ was formed.

Example 10

Synthesis of Bi-Luminescent Pigment

The synthesis of bi-luminescent pigments is show in FIG. 3. Making slurry of pre-synthesized 15 gm $Zn_{0.98}S:Cu_{0.02}^{2+}$ and 45 gm $Gd_{0.63}VO_4:Eu_{0.37}^{3+}$ (ratio of 1:3 by weight) in 30 ml ethanol. Dry for 24 hours at 60° C. and bi-luminescent pigment of Gd0.63VO4:Eu0.373+ @Zn0.98S:Cu0.022+ was formed.

Example 11

Figure 4:
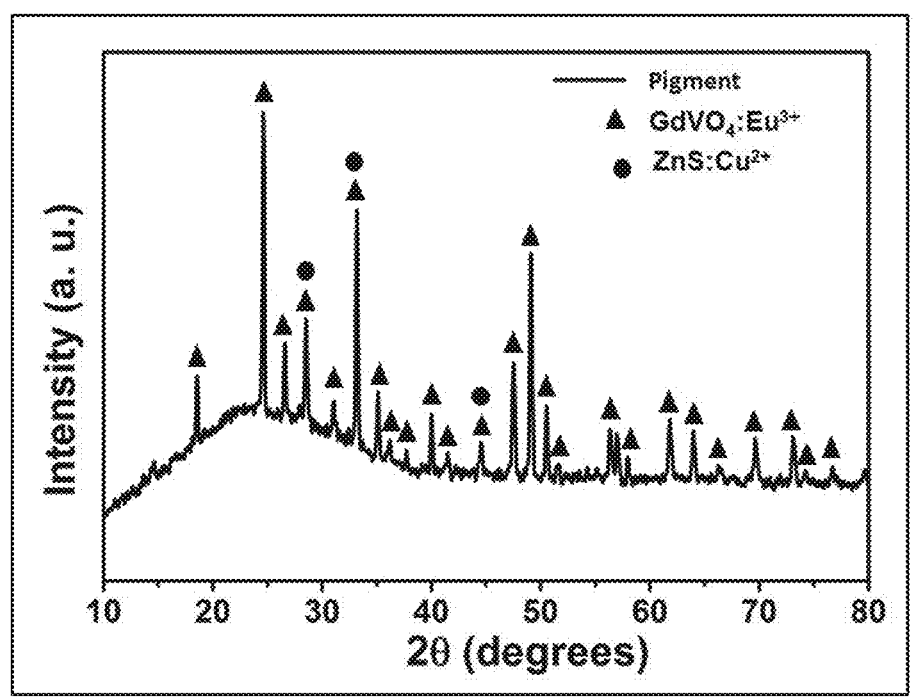
FIG. 4 represents X-ray powder diffraction (XRD) spectra of bi-luminescent pigment.
Figure 5:
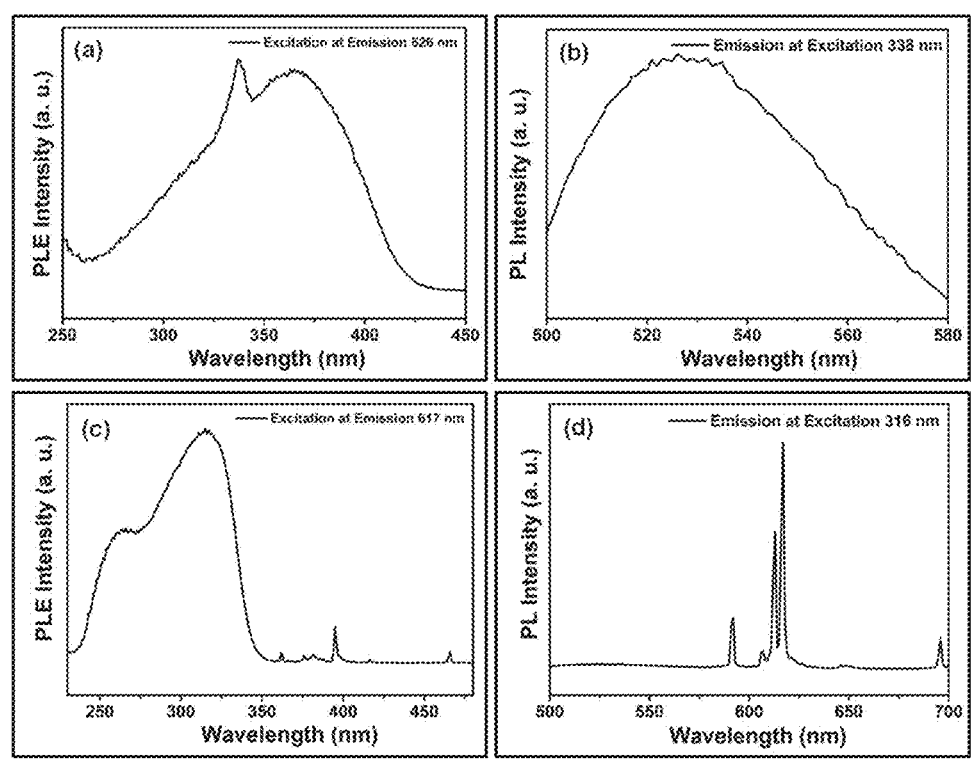
FIG. 5 represents (a) Excitation spectrum of bi-luminescent pigment at emission 526 nm, (b) Emission spectrum of bi-luminescent pigment at excitation 338 nm, (c) Excitation spectrum of bi-luminescent pigment at emission 617 nm and (d) Emission spectrum of bi-luminescent pigment at excitation 316 nm.
Figure 6:
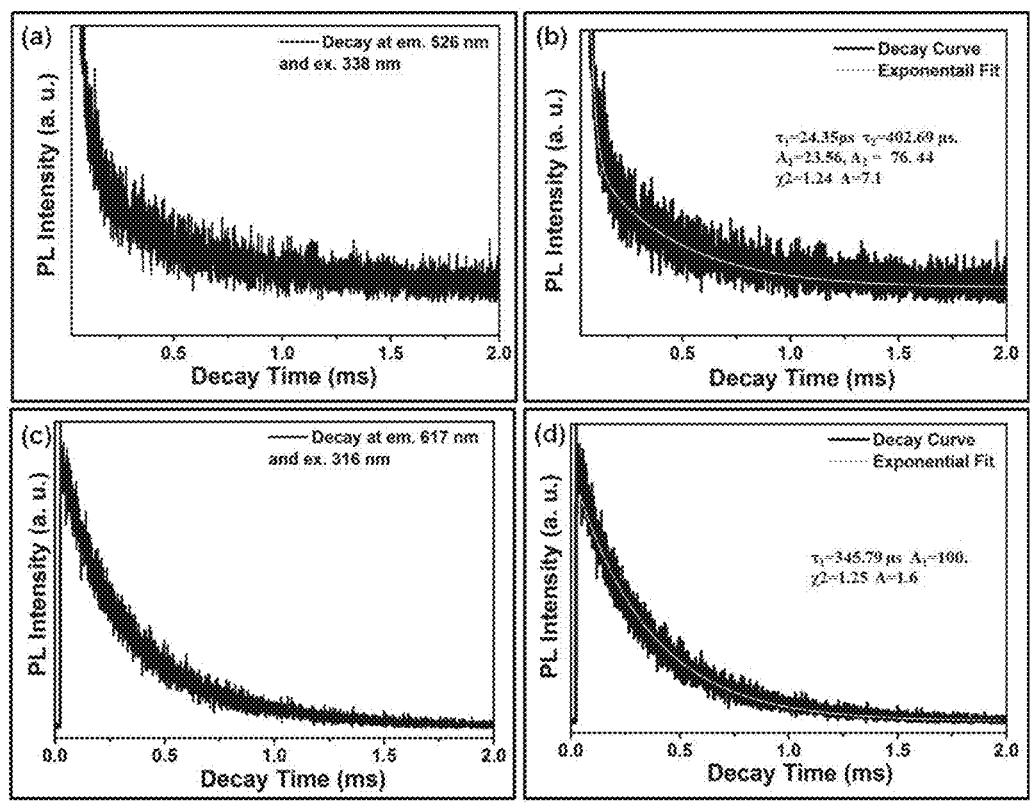
FIG. 6 represents (a) and (b) Time Resolved photoluminescence (TRPL) decay profile of bi-luminescent pigment recorded emission 526 nm and excitation wavelength of 338 nm and exponential fitting of decay profile and the parameters generated by the exponential fitting. (c) and (d) TRPL decay profile of bi-luminescent pigment recorded at emission 617 nm at an excitation wavelength of 316 nm and exponential fitting of decay profile parameters generated by the exponential fitting.

Characterization of Bi-Luminescent Pigment (i) X-ray diffraction (XRD)
   FIG. 4 shows the XRD pattern of the bi-luminescent pigment powder reveals the presence of cubic sphalerite phase of ZnS (JCPDS #80-0020) and cubic phase of GdVO$_4$ crystals (JCPDS #74-1987).
(ii) Photoluminescence (PL) spectroscopy
   FIGS. 5 and 6 represent the photoluminescence and time-resolved result of bi-luminescent pigment recorded by using an Edinburgh Instruments spectrometer, where a xenon lamp and flesh lamp act as the sources of excitations. The colour-coordinate were estimated from emission spectra of red and green emission, respectively. To estimate the absolute luminescence quantum efficiency of bi-luminescent pigment, an integrating sphere equipped with a spectrometer FLS900 (Edinburgh Instruments, UK) has been used for measuring the integrated fraction of the luminous flux and the radiant flux using the standard method. The estimated quantum efficiencies for green and red emissions are 68%, and 85%, respectively.

Figure 10:
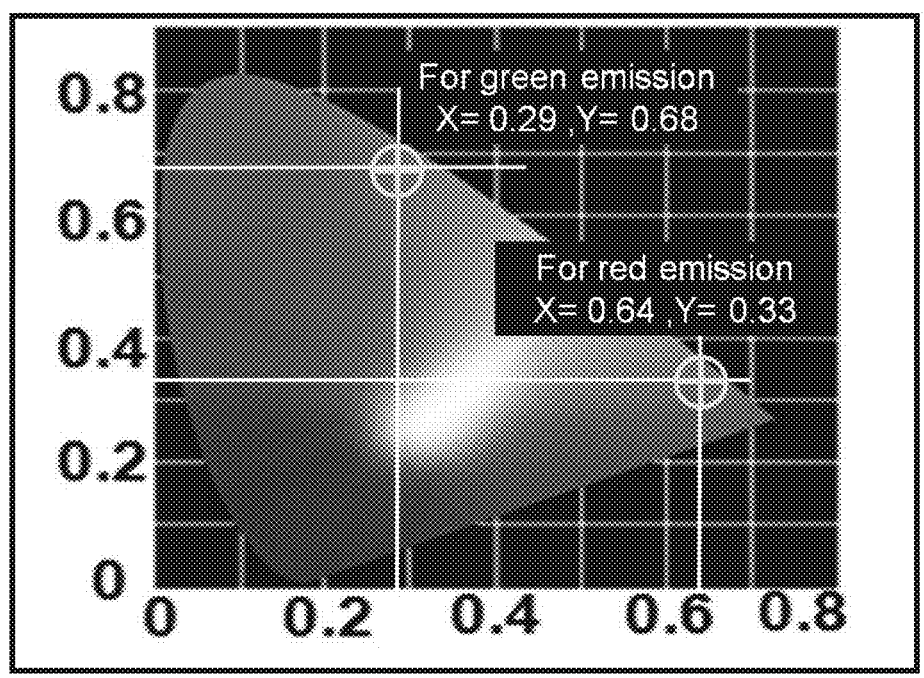
FIG. 10 represents CIE color coordination for green and red emission.

In FIG. 10, CIE color coordination for green emission are x=0.29 and 0.68 and for red emission are x=0.64 and 0.33.

The bi-luminescent pigment have broad excitation in the range of 234-350 nm centered at 316 nm which is originated from the charge transfer (CT) between $O^{2-} \rightarrow Eu^{3+}$ and other excitations peaks at 362 nm, 395 nm and 466 nm are due to the f-f transitions within $4F^6$ electron shell of the $Eu^{3+}$ ion. The bi-luminescent pigment have emission peaks at 592 nm, 607 nm, 613 nm 617 nm and 696 nm which is ascribed to the $^5D_0$-$^7F_j$ (j=1, 2, 3) radiative transitions in $Eu^{3+}$ ion. The emission peak ate 617 nm have highest emission intensity.

(iii) Scanning electron microscope (SEM)

Figure 7:
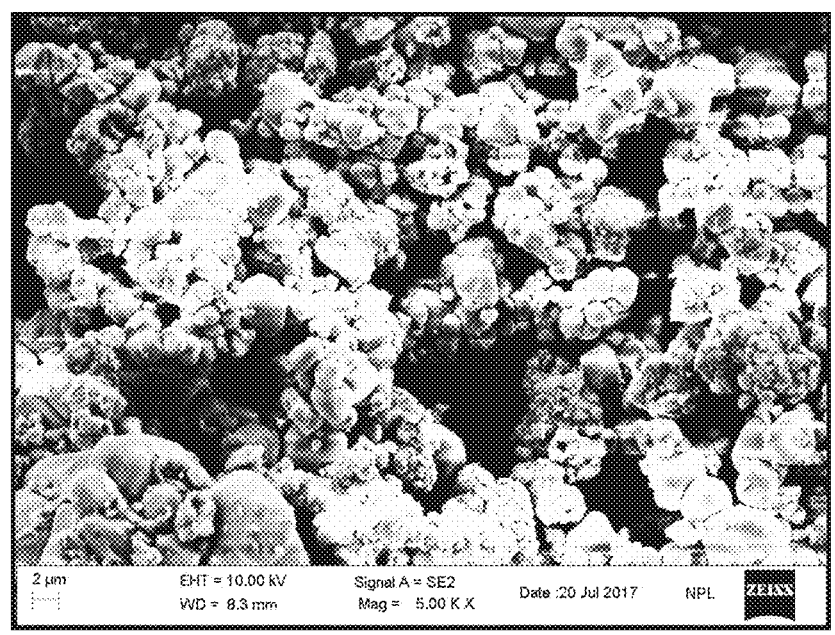
FIG. 7 represents Scanning Electron Microscope (SEM) image of bi-luminescent pigment.

The surface morphology of bi-luminescent pigment was examined by using field emission scanning electron microscope (FESEM) Carl ZEISS-SUPRA 40 VP. The surface morphology of bi-luminescent pigment is show in FIG. 7 and results reveal that the average particle size of the pigment is in the range of 1-5 μm.

Example 12

Bi-Luminescent Security Ink Formulation and Screen Printing Technique

Figure 8:
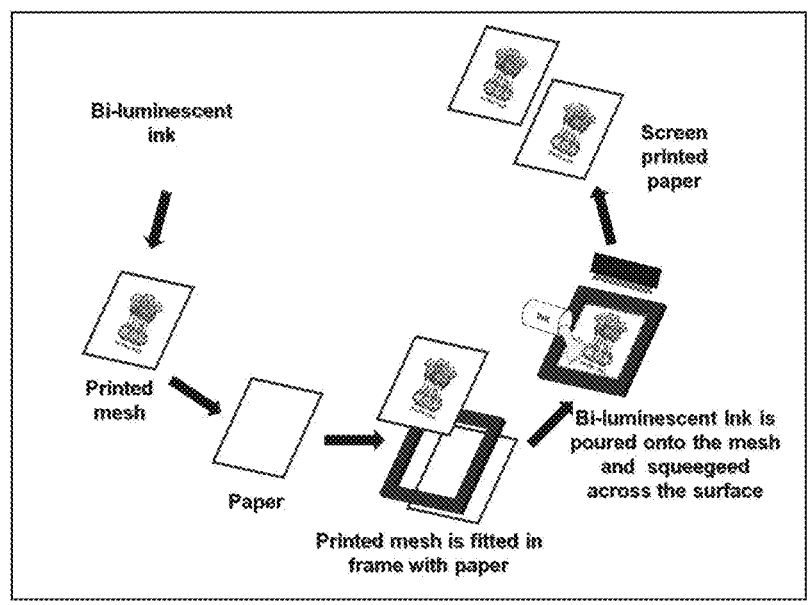
FIG. 8 represents the schematic for screen printing technique.

Polyvinyl chloride (PVC) gold medium was used to uniformly disperse the as-synthesized bi-luminescent pigment. Initially, 200 mg of bi-luminescent pigment was dispersed in 50 ml PVC gold medium while vigorous stirring with glass rod and then mixed ultrasonically at 45 kHz for 30 mins to obtain the ink. To print different patterns on black papers, a standard screen printing technique was used. The schematic for screen printing technique of bi-luminescent pigment is shown in FIG. 8.

Figure 9:
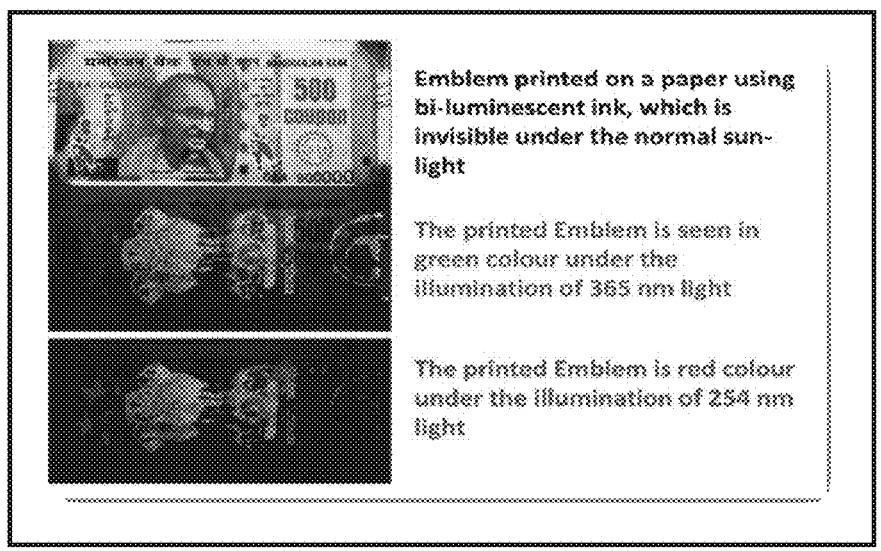
FIG. 9 represents demonstration of bi-luminescent security ink for anti-counterfeiting applications.

The FIG. 9 shows the photographs of printed pattern with bi-luminescent security ink which glows in prominent red and green colors when illuminated by two different excitation sources. Color figures are used to demonstrate bi-luminescent images.

ADVANTAGES OF THE INVENTION

Cost effective & Environment friendly.
Bi-luminescent security ink, excitable by two different wavelength sources, as a unique anti-counterfeiting feature.
Invention provides an indigenous development at an industrial scale of bi-luminescent security pigments for ink formulation.
The bi-luminescent security ink technology, with unique security feature in the currency notes, important documents, data etc.
It is easily printable with commercial available screen printing technique.

We claim:

1. A process for the preparation of a bi-luminescent security pigment, the process comprising the steps of:
   i. preparing a solution of $ZnCl_2$ and a solution of $Na_2S$ separately in water;
   ii. adding 1-3% by weight N-cetyl-N,N,N trimethylammonium bromide (CTAB) in the $ZnCl_2$ solution as prepared in step (i) with continuous stirring at a rate in a range of 400 to 500 rpm fora period in the range of 50 to 70 minutes at a temperature in a range of 25 to 35° C. to obtain a solution;
   iii. dropwise adding $Na_2S$ solution as prepared in step (i) to the solution as obtained in step (ii) with constant stirring at a rate in a range of 400 to 500 rpm followed by centrifuging at a rate in the range of 5000 to 6000 rpm to obtain a milky white precipitate;
   iv. washing and drying the precipitate as obtained in step (iii) at a temperature in a range of 70 to 80° C. to obtain a ZnS powder;
   v. mixing the ZnS powder as obtained in step (iv) with $CuCl_2$ followed by heating at a temperature in a range of 700 to 750° C. for a period in the range of 50 to 70 minutes to obtain $Zn_{1-x}S:Cu_x$ wherein x is 0.01-0.03;
   vi. mixing $Gd_2O_3$, $V_2O_5$ and $Eu_2O_3$ with $HNO_3$ to form a homogeneous mixture;
   vii. heating the mixture as obtained in step (vi) at a temperature in the range of 800 to 900° C. for a period in a range of 6 to 7 hours followed by cooling at a temperature in a range of 25 to 35° C. to obtain $Gd_{1-y}VO_4Eu_y$ wherein y is 0.29-0.39;
   viii. mixing $Zn_{1-x}S:Cu_x$ as obtained in step (v) and $Gd_{1-y}VO_4Eu_y$ as obtained in step (vii) separately in ethanol to form $Zn_{1-x}S:Cu_x$ and $Gd_{1-y}VO_4Eu_y$ slurries; and
   ix. mixing the slurries as obtained in step (viii) in a ratio ranging between 1.5:1 to 2:1 by volume followed by drying at a temperature in a range of 50 to 60° C. for a period in a range of 22 to 24 hours to obtain the bi-luminescent security pigment.

2. The process of claim 1, wherein mixing of the ZnS powder as obtained in step (iv) with $CuCl_2$ in step (v) is carried out in an agate mortar.

3. The process of claim 1, wherein the ZnS obtained in step (iv) is in the form of a white powder.

* * * * *